United States Patent
Zou et al.

(10) Patent No.: US 10,311,651 B2
(45) Date of Patent: Jun. 4, 2019

(54) METHOD AND SYSTEM FOR PROVIDING DYNAMIC PRICING ALGORITHM WITH EMBEDDED CONTROLLER FOR HIGH OCCUPANCY TOLL LANES

(75) Inventors: Guangyu Zou, Webster, NY (US);
Alvaro E. Gil, Rochester, NY (US);
Rakesh Kulkarni, Webster, NY (US);
Daniel W. Costanza, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 1534 days.

(21) Appl. No.: 13/407,931

(22) Filed: Feb. 29, 2012

(65) Prior Publication Data
US 2013/0226668 A1 Aug. 29, 2013

(51) Int. Cl.
*G06Q 30/00* (2012.01)
*G07B 15/06* (2011.01)
(Continued)

(52) U.S. Cl.
CPC ........... *G07B 15/063* (2013.01); *G06Q 10/04* (2013.01); *G06Q 10/06375* (2013.01);
(Continued)

(58) Field of Classification Search
CPC ........... G06Q 30/0255; G06Q 30/0235; G06Q 10/105; G06Q 10/103; G06Q 10/067;
(Continued)

(56) References Cited

U.S. PATENT DOCUMENTS 5,066,950 A * 11/1991 Schweitzer ............ G08G 1/054
340/936
5,696,503 A * 12/1997 Nasburg ............... G08G 1/0104
340/933
(Continued)

OTHER PUBLICATIONS

McDonald, et al, 2001, Simulated travel impacts of high-occupancy vehicle lane conversion alternatives, http://mcdonald.web.unc.edu/files/2014/12/McDonald_Noland_HOV_TRR2001.pdf.*
(Continued)

*Primary Examiner* — Mehmet Yesildag
*Assistant Examiner* — Uche Byrd
(74) *Attorney, Agent, or Firm* — Loza & Loza LLP; Kermit D. Lopez; Luis M. Ortiz (57) ABSTRACT

A method and system for providing a feedback based dynamic pricing algorithm with an embedded controller for a HOT (High Occupancy Toll) lane. An input-output transfer function of a vehicle flow with respect to a HOT lane can be obtained utilizing a simulation module. A feedback controller combined with, for example, a Smith predictor can be designed to avoid an unstable behavior due to a time delay in the HOT lane, a price regulation, and a large transient caused by an integral part of the controller due to traffic jams. A driver behavior preference model can be derived based on a relationship between a toll rate and several characteristics of the HOT lane and a general purpose lane. The feedback controller and the behavior preference model can then be implemented to set the toll rate in real-time in order to satisfy a desired performance metric.

20 Claims, 6 Drawing Sheets

(51) Int. Cl.
*G06Q 10/08* (2012.01)
*G06Q 10/06* (2012.01)
*G06Q 10/04* (2012.01)
*G06Q 30/02* (2012.01)

(52) U.S. Cl.
CPC ....... *G06Q 10/0837* (2013.01); *G06Q 30/014* (2013.01); *G06Q 30/016* (2013.01); *G06Q 30/0283* (2013.01); *G06Q 2240/00* (2013.01)

(58) Field of Classification Search
CPC .. G06Q 30/02; G06Q 10/06315; G06Q 40/00; G06Q 30/00; G06Q 30/06; H04Q 7/20
USPC .............................................. 705/7.11–7.42
See application file for complete search history.

(56) References Cited

U.S. PATENT DOCUMENTS

| | | | | | |
|---|---|---|---|---|---|
| 5,801,943 | A | * | 9/1998 | Nasburg | G08G 1/0104 340/910 |
| 5,805,082 | A | * | 9/1998 | Hassett | G01S 13/765 235/384 |
| 6,076,951 | A | * | 6/2000 | Wang | G05B 13/042 700/37 |
| 2008/0082096 | A1 | * | 4/2008 | Shores | A61B 18/1206 606/34 |
| 2009/0146845 | A1 | * | 6/2009 | Hedley | G06Q 30/0283 340/936 |
| 2009/0295599 | A1 | * | 12/2009 | Coffee | G08G 1/0104 340/928 |
| 2010/0070253 | A1 | * | 3/2010 | Hirata | G08G 1/0104 703/8 |
| 2010/0156670 | A1 | * | 6/2010 | Hamilton, II | G07B 15/06 340/928 |

OTHER PUBLICATIONS

Dong et al, 2011, Combined short-term traffic flow forecast model for Beijing Traffic Forecast System, http://ieeexplore.ieee.org/document/6083041/, pp. 638-643.*

Yingyan Lou et al., Optimal Dynamic Pricing Strategies for High-Occupancy/Toll Lanes, Feb. 2011, Transportation Research Part C: Emerging Technologies, vol. 19, Issue 1, pp. 64-74 (Year: 2011).*

Dong, J. et al., "State-dependent pricing for real-time freeway management: Anticipatory versus reactive strategies," *Transportation Research Part C: Emerging Technologies* (2011) 19(4):644-657.

Aström, K. J., "PID Control," *Control System Design* (2002), pp. 216-251.

Figueiredo, L., et al., "Simulation and dynamics of freeway traffic," *IEEE International Conference on Systems, Man and Cybernetics* Oct. 5-8, 2003, vol. 4, pp. 3607-3612.

Smith, O. J. M., "A Controller to Overcome Dead Time," *ISA Journal* Feb. 1959, 6(2):28-33.

Yin, Y. et al., "Dynamic Tolling Strategies for Managed Lanes," *Journal of Transportation Engineering* (2009) 135(2):45-52.

Zhang, G. et al., "A Feedback-Based Dynamic Tolling Algorithm for High-Occupancy Toll Lane Operations," *Transportation Research Record: Journal of the Transportation Research Board*, No. 2065 (2008) Transportation Research Board of the National Academies, Washington, D.C., pp. 54-63.

* cited by examiner

METHOD AND SYSTEM FOR PROVIDING DYNAMIC PRICING ALGORITHM WITH EMBEDDED CONTROLLER FOR HIGH OCCUPANCY TOLL LANES

TECHNICAL FIELD

Embodiments generally relate to traffic management and HOT (High Occupancy Toll) lanes. Embodiments are also related to pricing schemes for minimizing traffic congestion. Embodiments are additionally related to a feedback based dynamic congestion pricing algorithm for HOT lanes.

BACKGROUND OF THE INVENTION

Traffic congestion is a condition on a road network that occurs as use increases and is characterized by slower speeds, longer trip times, and increased vehicular queueing. Several travel demand management techniques have been attempted to alleviate traffic congestion. For example, HOT lanes (High occupancy/toll lanes) can be employed to encourage people to share rides and thus decrease the amount of vehicles on the roads.

HOT lanes can be implemented in the context of a road pricing scheme that provides motorists in a vehicle access to a HOV (High Occupancy Vehicle) lane. Sometimes entire roads can be designated for the use of HOVs. Tolls can be collected either by a manned toll booth, automatic number plate recognition, or an electronic toll collection system. Typically, these tolls increase as traffic density and congestion within the tolled lanes increases, a policy known as congestion pricing. The goal of this pricing scheme is to minimize traffic congestion within the lanes. The pricing scheme in HOT lanes can be implemented utilizing a static approach and a dynamic approach. The prices can be defined based on time of the day in the static approach. Such an approach, however, cannot maintain a level of service in the HOT lanes (e.g., average speed, throughput, etc.) since it does not dynamically adjust the HOT toll rate in real-time.

With the advent of electronic toll collection systems, pricing can also be accomplished dynamically so that the tolls can be set in real-time depending on the traffic conditions. The majority of prior art dynamic pricing algorithms are elementary in nature and do not consider the dynamics of the system. Although some dynamic pricing algorithms utilize a feedback control law, they often result in fluctuations with respect to average speed or throughput in the HOT lanes. Such fluctuations can arise when there are time delays or traffic jams present in the HOT lanes.

Based on the foregoing, it is believed that a need exists for an improved method and system for providing a feedback based dynamic pricing algorithm with an embedded controller for a high occupancy toll lane, as will be described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved HOT (High Occupancy Toll) lane enforcement method and system.

It is another aspect of the disclosed embodiments to provide for are improved dynamic pricing algorithm for HOT lanes.

It is a further aspect of the disclosed embodiments to provide for an improved method and system for providing a feedback based dynamic pricing algorithm with an embedded controller for a high occupancy toll lane.

The aforementioned aspects and other objectives and advantages can now be achieved as described herein. A method and system for providing a feedback based dynamic pricing algorithm with an embedded controller for a high occupancy toll lane is disclosed herein. An input-output transfer function of a vehicle flow with respect to a HOT lane can be obtained utilizing a simulation module. A feedback controller combined with, for example, a Smith predictor, can be designed to avoid an unstable behavior due to a time delay in the HOT lane, a price regulation, and a large transient caused by an integral part of the controller due to traffic jams. A driver behavior preference model can be derived based on a relationship between a toll rate and several characteristics of the HOT lane and a general purpose lane. The feedback controller and the behavior preference model can then be implemented to set the toll rate in real-time in order to satisfy a desired performance metric (e.g., average throughput or speed in the HOT lanes).

The input-output transfer function of the vehicle flow can be derived offline utilizing historical data to define model parameters and/or the vehicle flow can be derived online by using a set of recent data. The input and output vehicle flow data can be collected and a model can be built utilizing the traffic simulation module and the collected input flow data. The simulation model can be calibrated until a simulated output is similar to a real output. The simulation model can batch-run multiple times to obtain a group of pairs of input and output values for different vehicle's density total flow and initial conditions. The input and output vehicle's flow from a time domain can be converted to a frequency domain utilizing Fourier transformation. A series of complex number of the output can be divided by the input for each frequency to get a group of transfer functions. A median of the group of transfer functions can be computed as a statistic transfer function. Parameters ($\alpha$, $\tau$, p and $\kappa_B$) of the transfer function can be estimated utilizing optimization to fit the statistic transfer function. The statistic transfer function can be converted to a discrete transfer function and solved to obtain the output vehicle flow and an input vehicle flow model. System identification (e.g., autoregressive polynomial models) is another approach that can be employed for obtaining the discrete flow model.

The feedback controller can be designed utilizing a Proportional-Integral-Derivative (PID) controller, Smith predictor, and an anti-windup compensator to avoid an unstable behavior due to the time delay and the price regulation. The Smith predictor in association with the controller avoid the unstable behavior due to the time delay. The anti-windup design can be utilized to avoid the interaction between the integral part of the controller and actuator saturations if the controller is the PID controller. Designing a toll rate regulator and a saturation block can regulate the toll rate change within a time interval.

The driver behavior preference model estimates the toll rate that can be set at the HOT lanes for a set of inputs, for example, proportion of vehicles in the HOT lanes compared to the total number of vehicles, vehicle's flow density, travel times on the HOT and the general purpose lanes, value of time, etc. A utility function can be defined for the HOT and the general purpose lanes. The utility function can be implemented in the traffic simulation module and a function that relates the toll rate as a function of the set of inputs can be derived. The vehicles can choose to take the HOT lanes if the utility function for the HOT lane is greater than the utility function for the general purpose lane. Otherwise, the drivers can take the general purpose lanes.

The traffic simulator can be employed to rune up the controller. The estimated time delay obtained during the modeling of the HOT lanes can be employed by the system when the current time delay is unknown. The time delay information can be employed by the system to update the variables if the time delay is known. Such a dynamic approach considers a solid control theoretical mean (e.g., stability, convergence rate, actuator saturation, etc.) to design the controller that perform well when there is traffic flow delay and traffic jams and integrates the behavior of drivers.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the present invention can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium, Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 1:
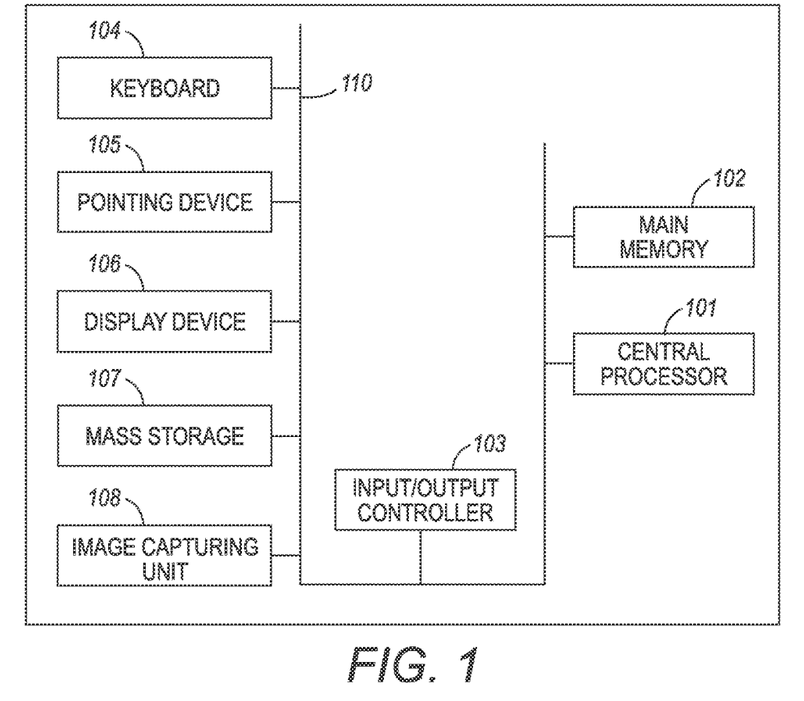
FIG. 1 illustrates a schematic view of a computer system, in accordance with the disclosed embodiments.
Figure 2:
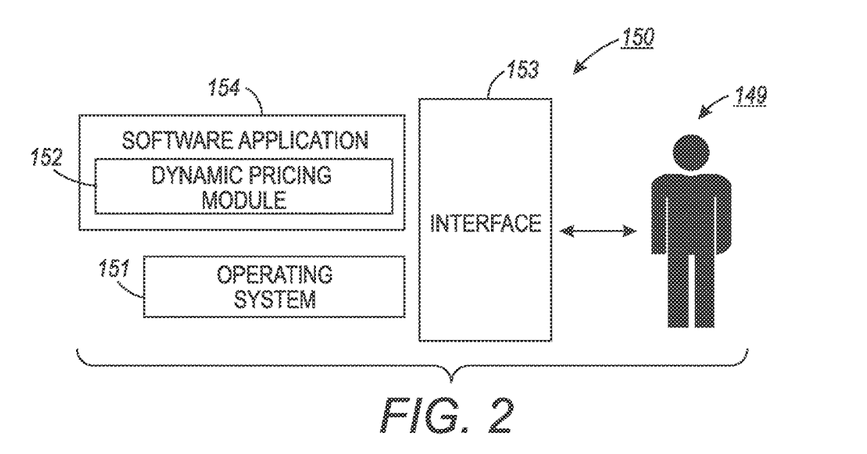
FIG. 2 illustrates a schematic view of a software system including a dynamic pricing module, an operating system, and a user interface, in accordance with the disclosed embodiments.

FIGS. 1-2 are provided as exemplary diagrams of data-processing environments in which embodiments of the present invention may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a system bus 110, a central processor 101, a main memory 102, an input/output controller 103, a keyboard 104, an input device 105 (e.g., a pointing device such as a mouse, track ball, and pen device, etc.), a display device 106, a mass storage 107 (e.g., a hard disk), and an image capturing unit 108. Note that the embodiments shown in FIG. 1 are depicted with respect to a user 149.

In some embodiments, for example, a USB peripheral connection (not shown in FIG. 1) and/or other hardware components may also be in electrical communication with the system bus 110 and components thereof. As illustrated, the various components of data-processing system 100 can communicate electronically through the system bus 110 or a similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and on mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154.

The following discussion is intended to provide a brief, general description of suitable computing environments in which the system and method may be implemented, Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153, which is preferably a graphical user interface (GUI), also serves to display results, whereupon the user may supply additional inputs or terminate the session. In an embodiment, operating system 151 and interface 153 can be implemented in the context of a "Windows" system. It can be appreciated, of course, that other types of systems are possible. For example, rather than a traditional "Windows" system, other operation systems such as, for example, Linux may also be employed with respect to operating system 151 and interface 153. The software application 154 can include a dynamic pricing module 152 for providing a feedback based dynamic pricing algorithm with an embedded controller for a high occupancy toll lane. Software application 154, on the other hand, can include instructions such as the various operations described herein with respect to the various components and modules described herein such as, for example, the methods 600 and 700 depicted in FIGS. 6-7.

FIGS. 1-2 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, UNIX, LINUX, and the like.

Figure 3:
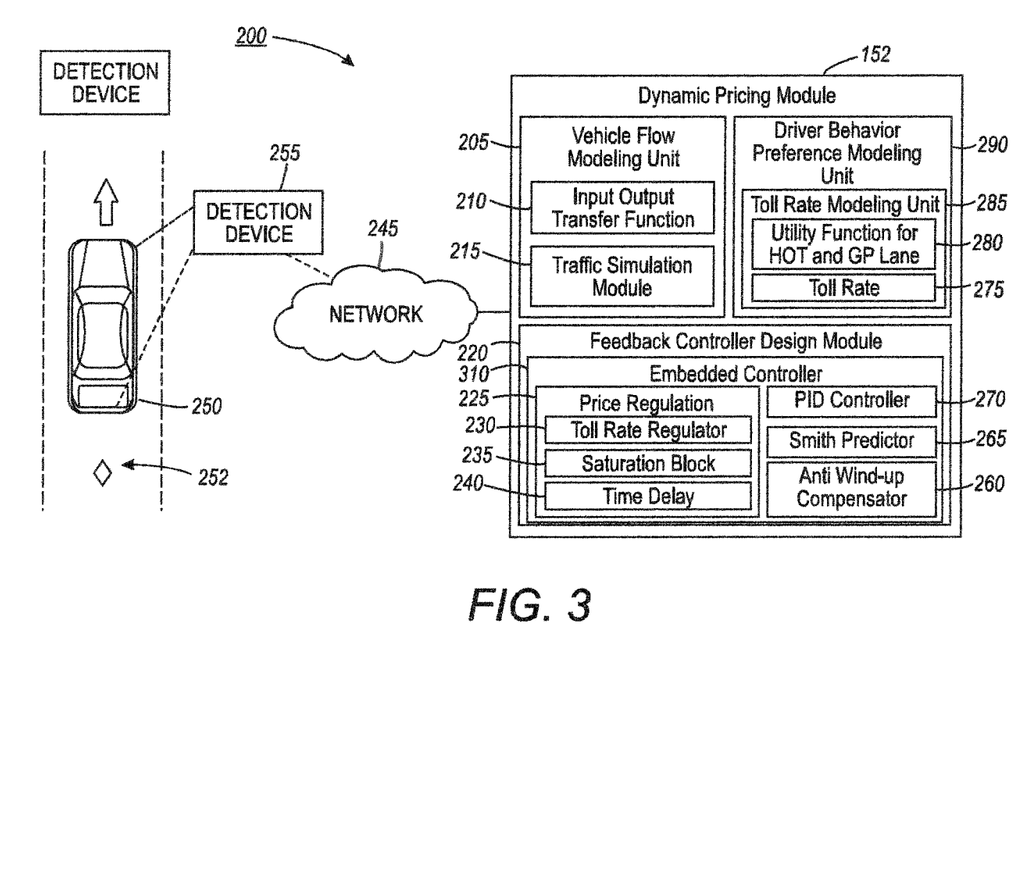
FIG. 3 illustrates a block diagram of a feedback based dynamic pricing system having an embedded controller for a high occupancy toll lane, in accordance with the disclosed embodiments.

FIG. 3 illustrates a block diagram of a feedback based dynamic pricing system 200 having an embedded controller 310 for a high occupancy to lane 252, in accordance with the disclosed embodiments. Note that in FIGS. 1-7, identical or similar blocks are generally indicated by identical reference numerals. The toll lane 252 can be, for example, a HOT (High Occupancy Toll) lane. HOT lanes require single-occupant vehicles to pay a toll that varies based on demand called congestion pricing. The tolls change throughout the day according to real-time traffic conditions, which is intended to manage the number of vehicles in the lanes to keep them less congested.

The feedback based dynamic pricing system 200 generally includes a detection device 255 such as, for example, a video camera, a sensor, loop detectors, etc., for sensing and capturing an image of a vehicle 250 within an effective field of view. The detection device 255 can be operatively connected to the dynamic pricing module 152 via a network 245. The image capturing unit 108 may include built-in integrated functions such as image processing, data formatting, and data compression functions.

Note that the network 245 may employ any network topology, transmission medium, or network protocol. The network 245 may include connections such as wire, wireless communication links, or fiber optic cables. Network 245 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The dynamic pricing module 152 can be configured to include a vehicle flow modeling unit 205, a driver behavior preference modeling unit 290, and a feedback controller design module 220. It can be appreciated that the vehicle flow modeling unit 205 and the driver behavior preference modeling unit 290 can be implemented as software modules. The vehicle flow modeling unit 205 obtains an input-output transfer function 210 of a vehicle flow with respect to the HOT lane 252 utilizing a traffic simulation module 215. Note that the output vehicle flow and an input vehicle flow transfer function 210 can be derived offline using historical data to define the model parameters and/or the vehicle flow can be derived online by using a set of recent data. The vehicle flow transfer function 210 can be obtained by building a model using traffic simulation software 215 and the collected input flow data. In general, the traffic simulation software 215 is the mathematical modeling of transportation systems through the application of computer software to better help plan, design, and operate transportation systems.

The feedback controller design module 220 designs the feedback controller 310 to avoid an unstable behavior due to a time delay 240 in the HOT lane 252, price regulations 225, and large transients caused by the integral part of the controller 310 due to traffic jams. The feedback controller 310 can be designed utilizing a Proportional-Integral-Derivative (PID) controller 270, Smith Predictor 265, and an anti-windup compensator 260 to avoid an unstable behavior due to the time delay 240 and the price regulations 225. The Smith predictor 265 in association with the controller 310 avoid the unstable behavior due to the time delay 240. The anti-windup design 260 can be utilized to avoid the interaction between the integral part of the controller 310 and actuator saturations if the controller is the PID controller 270. Designing a toll rate regulator 230 and a saturation block 235 can regulate the toll rate change within a time interval.

The driver behavior preference modeling unit 290 includes a toll rate modeling unit 285 to derive a driver behavior preference model based on a relationship between a toll rate 275 and several characteristics of the HOT lanes 252 and the general purpose lanes. The driver behavior preference unit 290 estimates the toll rate 275 that can be set at the HOT lanes 252 for a given set of inputs, for example, proportion of vehicles in the HOT lanes compared to the total number of vehicles, vehicle's flow density, travel times on the HOT and the general purpose lanes, value of time, etc.

A utility function 280 can be defined for the HOT and the general purpose lanes. The utility functions 280 can be implemented in the traffic simulation software 215 and a function that relates the toll rate 275 as a function of the set of inputs can be derived. The vehicles 250 can choose to take the HOT lanes 252 if the utility function for the HOT lane 252 is greater than the utility function for the general purpose lane. Otherwise, the drivers can take the general purpose lanes. The feedback controller 310 and the behavior preference model 290 can then be mplemented to set the toll rate 275 in real-time in order to satisfy a desired performance metric (e.g., average throughput or speed in the HOT lanes).

An example of how the utility functions and driver behavior preference modeling can be used in this embodiment is as follows: Define a utility function for the HOT, $U_{HOT}=(\alpha TT_{HOT}+TR)^{-1}$, and general purpose (GP), $U_{GP}=(\alpha TT_{GP})^{-1}$ lanes. The parameter $\alpha$ is the value of time, $TT_{HOT}$ and $TT_{GP}$ are the travel times for the HOT and GP lanes respectively. Implementing the utility functions in a traffic simulation software, then a model that relates the Toll Rate (TR) as a function of proportion of vehicles entering the HOT lanes, $P_{HOT}$, travel times on the HOT and GP lanes, value of time and the total flow density, $\emptyset_T$ of the vehicles can be derived. Given a specific $\emptyset_T$ by regression, TR=f ($P_{HOT}$, $\emptyset_T$, $TT_{HOT}$, $TT_{GP}$) can be obtained, but other additional inputs can be added to this model.

Figure 4:
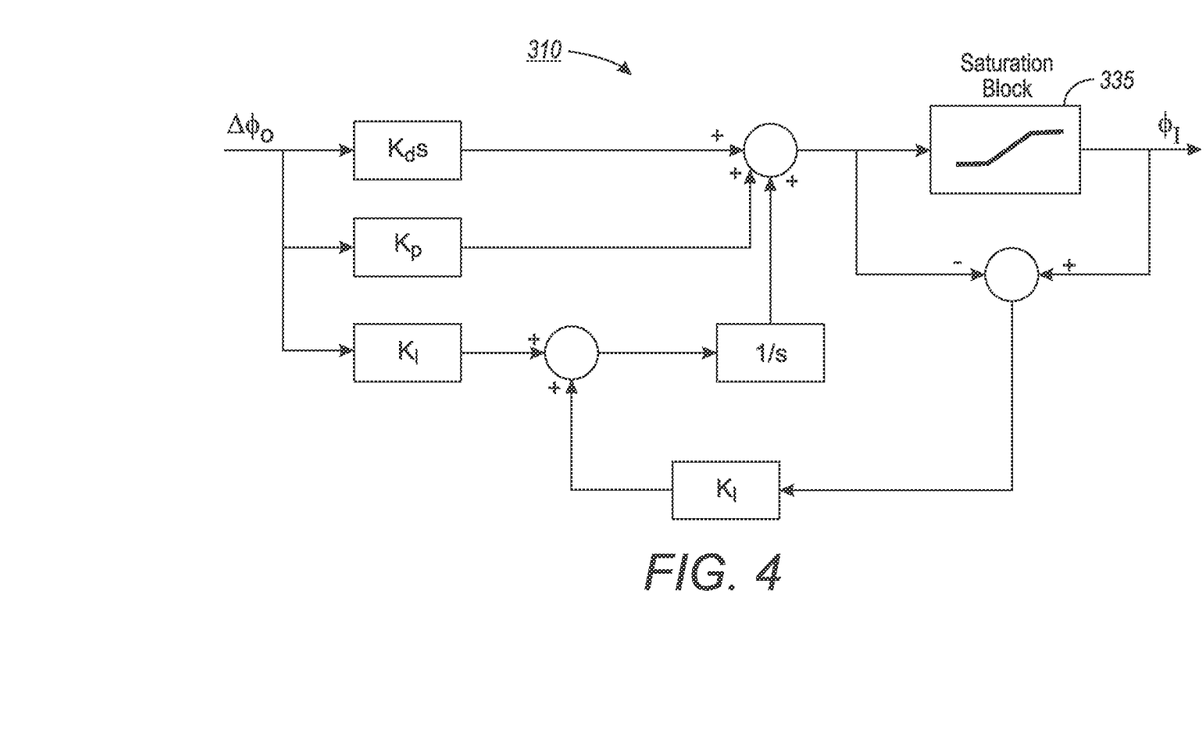
FIG. 4 illustrates a schematic block diagram of a PID controller associated with an anti-windup compensator, in accordance with the disclosed embodiments.

FIG. 4 illustrates a detailed block diagram of the controller 310 with the anti-windup compensator 260, in accordance with the disclosed embodiments. The proportional-integral-derivative controller 310 is a generic control loop feedback mechanism (controller) widely used in industrial control systems. The PID controller 270 calculates an "error" value as the difference between a measured process variable and a desired set point. The controller 310 attempts to minimize the error by adjusting the process control inputs. The PID controller 270 calculation (algorithm) involves three separate constant parameters the proportional $k_p$, the integral $k_i$, and derivative values $k_d$. These values can be interpreted in terms of time: P depends on the present error, I on the accumulation of past errors; and D is a prediction of future errors, based on current rate of change.

The anti-windup design 260 can be implemented to avoid the interaction between the integral part of the controller 310 and actuator saturations. In general, an anti-windup scheme is one way to deal with the windup phenomena and is usually performed by adding an anti-windup compensator to the controller, which gives acceptable performance in the unsaturated region. When the control output reaches the actuator limits, the controller 310 can keep integrating the error and eventually become a very large value. The consequence of this is that the error requires an opposite sign for a certain time resulting in undesirable large transient in the controller response. The anti-windup design 260 is illustrated in FIG. 4 where $\Delta\Phi_o$ represents the error of the output flow in the HOT lanes 252 and $\phi_I$ is the input flow in the HOT lane 252. For example, if there are traffic jams in the HOT lane, $\Delta\Phi_o$ be high and the controller 310 will keep increasing $\phi_I$. However, there is a capacity for the HOT lanes 252 so there is a physical restriction on $\phi_I$. This physical limitation can be captured in a saturation block 335 and large transients can be avoided.

Figure 5:
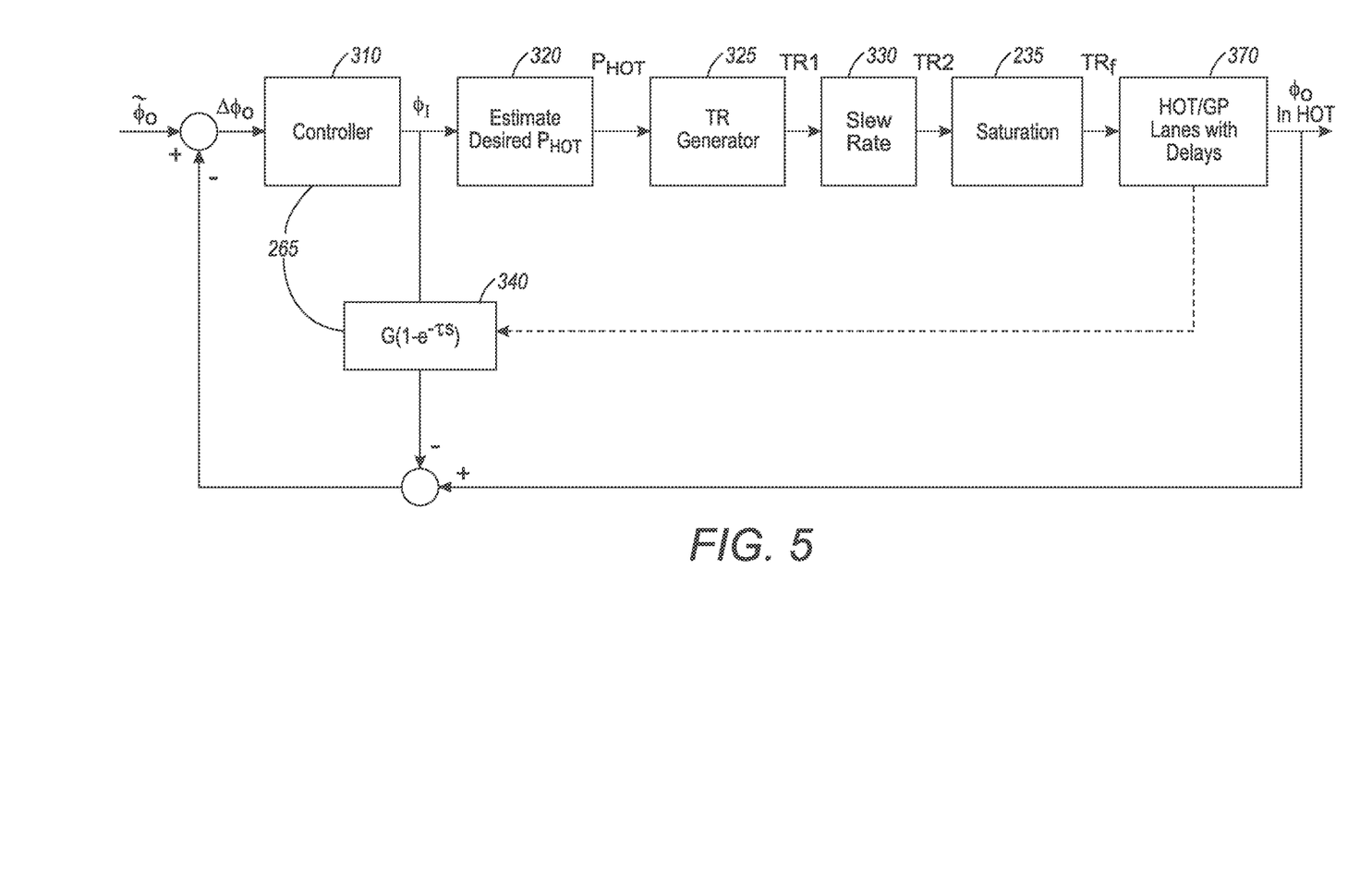
FIG. 5 illustrates a schematic block diagram of the dynamic pricing system having the embedded controller for the high occupancy toll lane, in accordance with the disclosed embodiments.

FIG. 5 illustrates a schematic block diagram of the dynamic pricing system 200 for the HOT lanes 252, in accordance with the disclosed embodiments. The dynamic pricing system 200 includes the controller 310, an estimate desired $P_{Hot}$ 320, a toll rate generator 325, a slew rate block 330, a saturation block 235, and a HOT/GP lane delays 370. The controller 310 and "$G(1-e^{-\tau s})$" block 340 forms the Smith predictor 265. The Smith predictor 265 is a type of predictive controller for systems with pure time delay 240. The time delay 240 between the input and output vehicle flow in the HOT lanes 252 may be large or small depending on the travel distances and/or the amount of traffic on the lanes 252. The time delays τ can be tackled at a design phase by utilizing the Smith predictor 265. The controller 310 can be designed with a model without any time delay 240 and it can then be integrated in the Smith predictor 265.

The unstable behavior due to price regulation 225 can be, for example, a minimum and maximum TR value that the controller 310 needs to guarantee and there even might be a maximum rate in which the TR values can be changed at a given timne interval. If there are requirements to fulfill regarding either a maximum positive, $R_p>0$, or negative, $R_n<0$, TR change within a time interval as well as the max, $TR_{max}$, and the min, $TR_{min}$, values, then this can be achieved as follows. The toll rate regulator 230 can be employed if $R_n \leq TR(k)-TR(k-1) \leq R_p$, then TR(k) is not modified. If $TR(k)-TR(k-1)>R_p$, then $TR(k)=TR(k-1)+R_p$. If $TR(k)-TR(k-1)<R_n$, then $TR(k)=TR(k-1)+R_n$. The saturation of TR can be performed by keeping the TR values within the desired range via the equation $TR(k)=\max(TR_{min}, \min(TR_{max},TR(k)))$. The slew rate 330 and the saturation block 235 have the formulas introduced in the toll rate regulator and saturation of the toll rate.

The modeling of the vehicle flow in the HOT lane 252, the design of the controller 310, and the modeling of the TR can be integrated into a two-step approach. The first step is to use a traffic simulator in the block HOT/GP lanes with delays 240 to tune up the controller 310. The controller 310 can then be implemented in real-time to dynamically set the price in the TR lanes. Note that when the current time delay is unknown, the system 200 employs the estimated time delay, τ, obtained during the modeling of the HOT lanes 252. G represents the output-input flow model of the HOT lanes 252. When the time delay is known, this information can be employed in the model to update the variable and hence a dotted line drawn from block 370 to the block 340 in FIG. 5.

Figure 6:
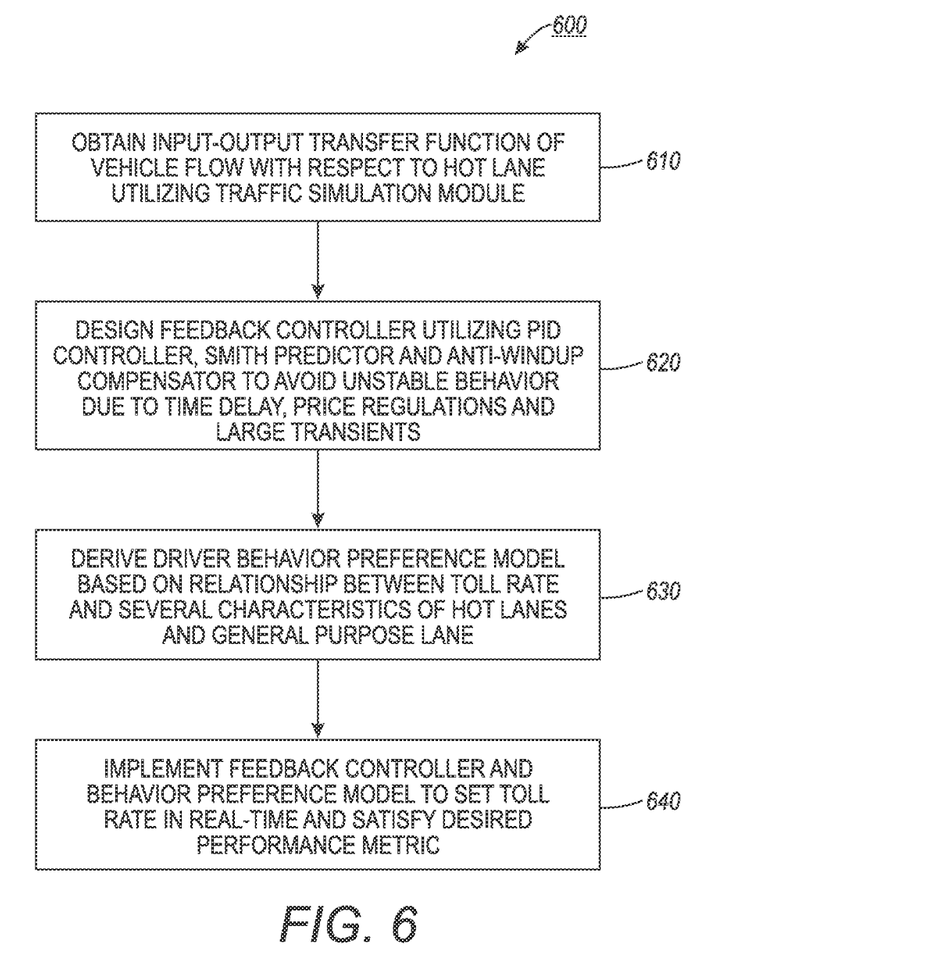
FIG. 6 illustrates a high level flow chart of operations illustrating logical operational steps of a method for providing a feedback based dynamic pricing algorithm with the embedded controller for the high occupancy toll lane, in accordance with the disclosed embodiments.

FIG. 6 illustrates a high level flow chart of operations illustrating logical operational steps of a method 600 for providing the feedback based dynamic pricing algorithm with the embedded controller 310 for the high occupancy toll lane 252, in accordance with the disclosed embodiments. It can be appreciated that the logical operational steps shown in FIGS. 6-7 can be implemented or provided via, for example, a module such as module 154 shown in FIG. 2 and can be processed via a processor such as, for example, the processor 101 shown in FIG. 1. Initially, as indicated at block 610, the input-output transfer function 210 of the vehicle flow with respect to the HOT lane 252 can be obtained utilizing the traffic simulation module 215.

Figure 7:
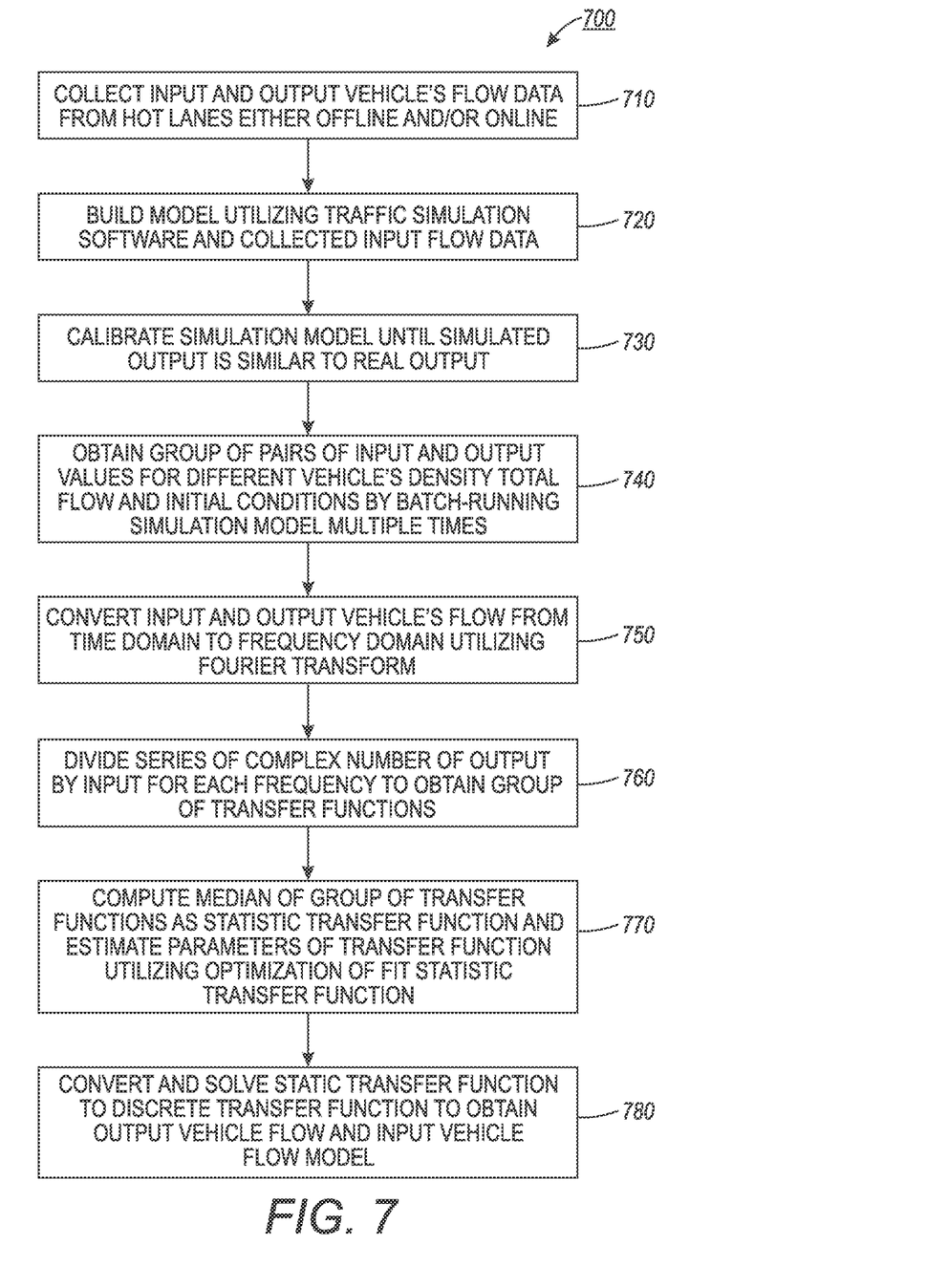
FIG. 7 illustrates a high level flow chart of operations illustrating logical operational steps of a method for obtaining input-output transfer function of the vehicle flow with respect to the HOT lane utilizing a simulation module, in accordance with the disclosed embodiments.

FIG. 7 illustrates a high level flow chart of operations illustrating logical operational steps of a method 700 for obtaining the input-output transfer function 210 of the vehicle flow with respect to the HOT lane 252 utilizing the traffic simulation module 215, in accordance with the disclosed embodiments. Initially, as indicated at block 710, the output and input vehicle transfer function 210 can be derived offline using historical data to define the model parameters and/or the vehicle flow can be derived online by using a set of recent data. A model can be built using the traffic simulation software 215 and the collected input flow data, as illustrated at block 720. Next, as show at block 730, the simulation model 215 can be calibrated until a simulated output is similar to a real output.

The simulation model 215 can batch-run multiple times to obtain a group of pairs of input and output values for different vehicle's density total flow and initial conditions, as indicated at block 740. The input and output vehicle's flow from the time domain can be converted to a frequency domain utilizing Fourier transform, as depicted at block 750. Thereafter, as illustrated at block 760, series of complex number of the output can be divided by the input for each frequency to get a group of transfer functions. A median of the group of transfer functions can be computed as a statistic transfer function. Parameters ($\alpha$, $\tau$, p, and $k_B$) of the transfer function can be estimated utilizing optimization to fit the statistic transfer function, as shown at block 770. The statistic transfer function can be converted to a discrete transfer function and solved to obtain the output vehicle flow and an input vehicle flow model, as depicted at block 780.

The feedback controller 310 can be designed to avoid an unstable behavior due to the time delay 240 in the HOT lane 252, price regulations 225, and large transients caused by the integral part of the controller due to traffic jams, as illustrated at block 620. Thereafter, as indicated at block 630, the driver behavior preference model 290 can be derived based on a relationship between the toll rate 275 and several characteristics of the HOT lanes 252 and a general purpose lane. The feedback controller 310 and the behavior preference model 290 can then be implemented to set the toll rate 275 in real-time in order to satisfy the desired performance metric (e.g., average throughput or speed in the HOT lanes), as shown at block 640. Such a dynamic approach considers solid control theoretical means (stability, convergence rate, actuator saturation, etc.) to design the controllers that perform well when there is traffic flow delay and traffic jams and integrates behavior of drivers.

Based on the foregoing, it can be appreciated that a number of embodiments are disclosed, both preferred and alternative. In one embodiment, for example, a method can be implemented for providing a feedback based dynamic pricing algorithm for a high occupancy toll lane. Such a method may include the steps or operations of obtaining an input-output transfer function of a vehicle flow with respect to a toll lane utilizing a traffic simulation module, utilizing a feedback controller to avoid an unstable behavior due to a time delay with respect to the toll lane, a price regulation and a large transient caused by an integral part of the feedback controller, and deriving a driver behavior preference model based on a relationship between a toll rate and a plurality of characteristics of the toll lane and a general purpose lane and thereafter implement the feedback controller and the behavior preference model to set the toll rate in real-time in order to satisfy a desired performance metric.

In another embodiment, a step or operation can be provided for deriving the input-output transfer function of the vehicle flow offline utilizing historical data to define a model parameter. In yet another embodiment, a step or operation can be provided for deriving the input-output transfer function of the vehicle flow online utilizing a set of recent data. In still other embodiments, the step or operation of obtaining the input-output transfer function can further comprise, for example, the steps or operations of collecting an input and output vehicle flow data from the toll lane and building a simulation model utilizing the traffic simulation module and the input vehicle flow data; calibrating the simulation model until a simulated output is similar to a real output and thereafter batch-running the simulation model a plurality of times to obtain a group of pairs of input and output values for different vehicle's density total flow and initial condition; and converting the input and output vehicle flow from a time domain to a frequency domain utilizing a Fourier transformation.

In yet other embodiments, steps or operations can be implemented for deriving a series of complex number of an output by an input for each frequency to obtain a plurality of transfer functions, computing a median of the plurality of transfer functions as a statistic transfer function and thereafter estimating the parameter of the plurality of transfer functions utilizing optimization to fit the statistic transfer function, and converting and solving the statistic transfer function to a discrete transfer function to obtain an output vehicle flow model and an input vehicle flow model. In still another embodiment, a step or operation can be provided for obtaining the discrete transfer function utilizing a system identification model. In some embodiments, the aforementioned system identification can comprise an autoregressive polynomial model.

In still other embodiments, the step or operation of designing the feedback controller can further comprise or involve steps or operations for designing the feedback controller utilizing a Smith predictor to avoid an unstable behavior due to the time delay, and configuring the feedback controller utilizing a proportional-integral-derivative controller and an anti-windup compensator to avoid interaction between the integral part of the controller and an actuator saturation. In yet another embodiment, a step of operation can be implemented for designing the feedback controller utilizing a toll rate regulator and a saturation block to regulate the toll rate change within a time interval.

In other embodiments, the step or operation of deriving the driver behavior preference model can further include or involve the steps or operations of estimating the toll rate that is set with respect to the toll lane for a set of inputs by the driver behavior preference model, defining a utility function for the toll lane and the general purpose lane and thereafter implement the utility function in the traffic simulation module and derive a function that relates the toll rate as a function of the set of inputs, and choosing or selecting the toll lane by the driver if the utility function with respect to the toll lane is greater than the utility function for the general purpose lane.

In still another embodiment, a step or operation can be implemented for selecting or choosing the general purpose lane by the driver if the utility function with respect to the general purpose lane is greater than the utility function for the toll lane. In other embodiments, a step or operation may be provided for tuning the controller utilizing a traffic simulator. In yet other embodiments, a step or operation can be provided for utilizing an estimated time delay obtained during modeling of the toll lane if a current time delay is unknown. In still other embodiments, the aforementioned toll lane can be, for example, a high occupancy toll lane.

In another embodiment, a system may be implemented for providing a feedback based dynamic pricing algorithm for a high occupancy toll lane. Such a system can include, in some embodiments, a processor; a data bus coupled to the processor, and a computer-usable medium embodying computer code, the computer-usable medium being coupled to the data bus. The computer program code can include, for example, instructions executable by the processor and configured for obtaining an input-output transfer function of a vehicle flow with respect to a toll lane utilizing a traffic simulation module; utilizing a feedback controller to avoid an unstable behavior due to a time delay with respect to the toll lane, a price regulation and a large transient caused by an integral part of the feedback controller; and deriving a driver behavior preference model based on a relationship between a toll rate and a plurality of characteristics of the toll lane and a general purpose lane and thereafter implement the feedback controller and the behavior preference model to set the toll rate in real-time in order to satisfy a desired performance metric.

In some embodiments, such instructions can be further configured for deriving the input-output transfer function of the vehicle flow offline utilizing historical data to define a model parameter. In other embodiments, such instructions can be further configured for deriving the input-output transfer function of the vehicle flow online utilizing a set of recent data.

In still other embodiments, the instructions for obtaining the input-output transfer function can be further configured for collecting an input and output vehicle flow data from the toll lane and building a simulation model utilizing the traffic simulation module and the input vehicle flow data; calibrating the simulation model until a simulated output is similar to a real output and thereafter batch-running the simulation model a plurality of times to obtain a group of pairs of input and output values for different vehicle's density total flow and initial condition; and converting the input and output vehicle flow from a time domain to a frequency domain utilizing a Fourier transformation.

In still other embodiments, instructions can be further configured for deriving a series of complex number of an output by an input for each frequency to obtain a plurality of transfer functions, computing a median of the plurality of transfer functions as a statistic transfer function and thereafter estimating the parameter of the plurality of transfer functions utilizing optimization to fit the statistic transfer function, and converting and solving the statistic transfer function to a discrete transfer function to obtain an output vehicle flow model and an input vehicle flow model.

In another embodiment, a processor-readable medium storing code representing instructions to cause a process to perform a process to provide a feedback based dynamic pricing algorithm for a high occupancy toll lane can be provided. In such a case, such code can include code to obtain an input-output transfer function of a vehicle flow with respect to a toll lane utilizing a traffic simulation module; utilize a feedback controller to avoid an unstable behavior due to a time delay with respect to the toll lane, a price regulation and a large transient caused by an integral part of the feedback controller; and derive a driver behavior preference model based on a relationship between a toll rate and a plurality of characteristics of the toll lane and a general purpose lane and thereafter implement the feedback controller and the behavior preference model to set the toll rate in real-time in order to satisfy a desired performance metric.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A high occupancy toll lane method, said method comprising:
    sensing the presence of a vehicle with a sensing device comprising a loop detector;
    capturing an image of said vehicle with an imaging device comprising a video camera;
    determining vehicle input flow for said toll lane according to said sensed vehicles and captured images with a special purpose computer configured for toll lane management;

obtaining an input-output transfer function of a vehicle flow with respect to said toll lane according to said vehicle input flow, utilizing a traffic simulation module with said special purpose computer;

utilizing a feedback controller, avoiding an unstable traffic condition on said toll lane due to a time delay between the input flow and an output flow with respect to said toll lane, due to a price regulation and due to a transient larger than a certain amount caused by an integral part of said feedback controller due to traffic with said special purpose computer;

deriving a driver behavior preference model according to a relationship between a toll rate and a plurality of characteristics of said toll lane and a general purpose lane, based on communication from the loop detector and video camera, wherein said plurality of characteristics comprise a proportion of vehicles in said toll lane compared to a total number of vehicles, vehicle density flow, travel times on said toll lane compared to travel time on said general purpose lane, and value of time with said special purpose computer; and setting said toll rate in real-time according to said feedback controller and said behavior preference model in order to satisfy a desired performance metric with said special purpose computer.

2. The method of claim 1 further comprising deriving said input-output transfer function of said vehicle flow offline utilizing historical data to define a model parameter with said special purpose computer.

3. The method of claim 1 further comprising deriving said input-output transfer function of said vehicle flow online utilizing a set of recent data.

4. The method of claim 1 wherein obtaining said input-output transfer function, further comprises:

collecting an input and output vehicle flow data from said toll lane and building a simulation model utilizing said traffic simulation module and said input vehicle flow data with said special purpose computer;

calibrating said simulation model until a simulated output is similar to a real output and thereafter batch-running said simulation model a plurality of times to obtain a group of pairs of input and output values for different vehicle's density total flow and initial condition with said special purpose computer; and converting said input and output vehicle flow from a time domain to a frequency domain utilizing a Fourier transformation with said special purpose computer.

5. The method of claim 4 further comprising:

deriving a series of complex number of an output by an input for each frequency to obtain a plurality of transfer functions with said special purpose computer;

computing a median of said plurality of transfer functions as a statistic transfer function and thereafter estimating said parameter of said plurality of transfer functions utilizing optimization to fit said statistic transfer function with said special purpose computer; and converting and solving said statistic transfer function to a discrete transfer function to obtain an output vehicle flow model and an input vehicle flow model with said special purpose computer.

6. The method of claim 1 further comprising obtaining said discrete transfer function utilizing a system identification model wherein said system identification model relates to the means by which the discrete transfer function is obtained with said special purpose computer.

7. The method of claim 6 wherein said system identification comprises an autoregressive polynomial model.

8. The method of claim 1 wherein designing said feedback controller, further comprises:

designing said feedback controller utilizing a Smith predictor to avoid an unstable behavior due to said time delay with said special purpose computer; and configuring said feedback controller utilizing a proportional-integral-derivative controller and an anti-windup compensator to avoid interaction between said integral part of said controller and an actuator saturation with said special purpose computer.

9. The method of claim 8 further comprising designing said feedback controller utilizing a toll rate regulator and a saturation block to regulate said toll rate change within a time interval with said special purpose computer.

10. The method of claim 1 wherein deriving said driver behavior preference model, further comprises:

estimating said toll rate that is set with respect to said toll lane for a set of inputs by said driver behavior preference model with said special purpose computer;

defining a utility function for said toll lane and said general purpose lane and thereafter implement said utility function in said traffic simulation module and derive a function that relates said toll rate as a function of said set of inputs with said special purpose computer; and choosing said toll lane by said driver if said utility function with respect to said toll lane is greater than said utility function for said general purpose lane.

11. The method of claim 10 further comprising choosing said general purpose lane by said driver if said utility function with respect to said general purpose lane is greater than said utility function for said toll lane.

12. The method of claim 1 further comprising tuning said controller utilizing a traffic simulator with said special purpose computer.

13. The method of claim 1 further comprising utilizing an estimated time delay obtained during modeling of said toll lane if a current time delay is unknown.

14. The method of claim 1 wherein said toll lane comprises a high occupancy toll lane.

15. A system for high occupancy toll lane management, said system comprising:

a special purpose computer comprising:

a sensor comprising a loop detector for sensing the presence of a vehicle;

an imaging device comprising a video camera for capturing an image of said vehicle;

a processor;

a data bus coupled to said processor; and a computer-usable medium embodying computer code, said computer-usable medium being coupled to said data bus, said computer program code comprising instructions executable by said processor and configured for:

determining vehicle input flow for said toll lane according to said sensed vehicles and captured images;

obtaining an input-output transfer function of a vehicle flow with respect to said toll lane according to said vehicle input flow, utilizing a traffic simulation module;

utilizing a feedback controller, avoiding an unstable traffic condition on said toll lane due to a time delay between the input flow and an output flow with respect to said toll lane, due to a price regulation and due to a transient larger than a certain amount caused by an integral part of said feedback controller due to traffic;

deriving a driver behavior preference model based on a relationship between a toll rate and a plurality of characteristics of said toll lane and a general purpose lane, based on communication from the loop detector and video camera, wherein said plurality of characteristics comprise a proportion of vehicles in said toll lane compared to a total number of vehicles, vehicle density flow, travel times on said toll lane compared to travel time on said general purpose lane, and value of time; and setting said toll rate in real-time according to said feedback controller and said behavior preference model in order to satisfy a desired performance metric.

16. The system of claim 15 wherein said instructions are further configured for deriving said input-output transfer function of said vehicle flow offline utilizing historical data to define a model parameter.

17. The system of claim 15 wherein said instructions are further configured for deriving said input-output transfer function of said vehicle flow online utilizing a set of recent data.

18. The system of claim 15 wherein said instructions for obtaining said input-output transfer function are further configured for:

collecting an input and output vehicle flow data from said toll lane and building a simulation model utilizing said traffic simulation module and said input vehicle flow data;

calibrating said simulation model until a simulated output is similar to a real output and thereafter batch-running said simulation model a plurality of times to obtain a group of pairs of input and output values for different vehicle's density total flow and initial condition; and converting said input and output vehicle flow from a time domain to a frequency domain utilizing a Fourier transformation.

19. The system of claim 15 wherein said instructions are further configured for:

deriving a series of complex number of an output by an input for each frequency to obtain a plurality of transfer functions;

computing a median of said plurality of transfer functions as a statistic transfer function and thereafter estimating said parameter of said plurality of transfer functions utilizing optimization to fit said statistic transfer function; and converting and solving said statistic transfer function to a discrete transfer function to obtain an output vehicle flow model and an input vehicle flow model.

20. A system comprising:

a special purpose computer comprising:

a sensing device comprising a loop detector for sensing the presence of a vehicle;

an image capturing device comprising a video camera for capturing an image of said vehicle; and a non-transitory processor-readable medium storing code representing instructions to cause a computer to perform a process to provide feedback based dynamic pricing for a high occupancy toll lane, said code comprising code to:

determine vehicle input flow for said toll lane according to said sensed vehicles and captured images;

obtain an input-output transfer function of a vehicle flow with respect to said toll lane according to said vehicle input flow, utilizing a traffic simulation module;

utilizing a feedback controller, avoid an unstable traffic condition on said toll lane due to a time delay between the input flow and an output flow with respect to said toll lane, due to a price regulation and due to a transient larger than a certain amount caused by an integral part of said feedback controller due to traffic;

derive a driver behavior preference model based on a relationship between a toll rate and a plurality of characteristics of said toll lane and a general purpose lane based on communication from the loop detector and video camera, wherein said plurality of characteristics comprise a proportion of vehicles in said toll lane compared to a total number of vehicles, vehicle density flow, travel times on said toll lane compared to travel time on said general purpose lane, and value of time; and, setting said toll rate in real-time according to said feedback controller and said behavior preference model in order to satisfy a desired performance metric.

* * * * *